Patented Nov. 28, 1933

1,936,739

UNITED STATES PATENT OFFICE 1,936,739

PROCESS OF MAKING ACID CHLORIDES

Robert V. Townend, Kearney, N. J., assignor to Pilot Laboratories, Inc., Arlington, N. J., a corporation of Delaware No Drawing. Application March 3, 1930
Serial No. 432,969

3 Claims. (Cl. 260—123)

This invention relates to a process of making acid chlorides of the higher acids of the aliphatic series.

Acid chlorides, particularly the chlorides of the aliphatic series of higher molecular weight have heretofore been made by reacting on the respective acid with phosphorus trichloride according to the reaction;

$$3RCOOH + PCl_3 = 3RCOCl + P(OH)_3$$

During the course of the reaction the phosphorus acid formed as indicated in the above equation separates from the acid chloride. This reaction does not, however, go to completion at ordinary temperatures. Even with an excess of the phosphorus trichloride and permitting the mixture to stand for a considerable time, for example several days, the reaction is still far from complete. If the mixture be subjected to heat, side reactions take place forming some elemental phosphorus and also forming acid anhydrides according to the equation;

$$RCOCl + RCOOH = (RCO)_2O + HCl.$$

Consequently the results are not improved by the application of heat.

Acid chlorides may also be made by reacting on the acids with phosphorus pentachloride according to the equation;

$$RCOOH + PCl_5 = RCOCl + POCl_3 + HCl$$

Although this action goes more nearly to completion, it requires the use of a relatively large amount of the re-agent, as indicated by the reaction. Moreover, the phosphoryl chloride formed in the reaction is miscible with the acid chloride formed and a physical separation is not possible. Separation by distillation is difficult, expensive and unsatisfactory.

An object of my invention is to provide a process whereby the acid chloride may be prepared with a minimum amount of acid anhydrides, phosphorus acid, phosphoryl chloride or other products of undesired reaction.

Other and further objects of the invention are to provide a process of making acid chlorides in a pure state uncontaminated with the products of undesired reactions, to provide a process in which acid chlorides may be formed by reaction with phosphorus trichloride and substantially all of the acid converted to the chloride, and to provide a method of forming acid chlorides substantially free of acid anhydrides and containing but a minimum quantity of phosphoryl chloride.

With these and other objects in view which will more fully appear from the following description, my invention comprises the process and products described in the following specification and defined in the claims.

In my present invention the organic acids to be treated are mixed with phosphorus trichloride at approximately room temperature and permitted to stand for a time sufficient to convert a large or major portion of the acids to the acid chlorides. The phosphorus acid formed in accordance with the above equation is then permitted to separate and is withdrawn. A stream of chlorine gas is then passed into the mixture of unreacted phosphorus trichloride, acid chloride and organic acid. The chlorine combines directly with the phosphorus trichloride remaining in the mixture to form phosphorus pentachloride in accordance with the equation:

$$PCl_3 + Cl_2 = PCl_5.$$

The reaction mixture thus formed is then warmed somewhat and the unreacted acids all converted to acid chlorides. Any acid anhydrides which may have been formed previously by the reaction of phosphorus trichloride on the acids are also converted to the chloride according to the reaction;

$$(RCO)_2O + PCl_5 = RCOCl + POCl_3.$$

In the above chlorination the chlorine combines instantly and completely with the phosphorus trichloride until no phosphorus trichloride remains in the mixture. The amount of chlorine necessary for the conversion of the phosphorus trichloride to phosphorus pentachloride can, therefore, be easily determined by noting the appearance of free chlorine above the surface of the mixture as soon as an excess is present. In this manner a substantially 100% conversion of the acids to acid chloride is obtained. A small amount of phosphorus pentachloride and of phosphoryl chloride remains in the mixture. However, as the greater part of the acids have been converted to the chlorides by means of the phosphorus trichloride, the amount of phosphorus pentachloride and of phosphoryl chloride remaining in the mixture is reduced to a minimum and is, for most uses, unobjectionable. The reaction may be used for converting either a single acid or a mixture of acids to the corresponding chlorides. The relative proportion of phosphorus trichloride to organic acid may be varied to meet various conditions. Where a substantially complete conversion of the acid to chloride is desired, it is advisable to use a slight excess of the phosphorus trichloride. I have found a proportion of from 1.2 to 1.5 mols of phosphorus trichloride to 3 mols of acid to give excellent results.

An example of the conversion of a fatty acid or mixture of fatty acid to the corresponding chlorides is as follows: 475 pounds of cocoanut oil acids, that is, the fatty acids obtained by saponification of cocoanut oil having an average molecular weight of about 205 are melted in a suitable container and mixed with 160 pounds of phosphorus trichloride while maintained at a temperature of about 30° C. After the acid and the trichloride have been thoroughly mixed, the mixture is permitted to stand for about two days while the mixture is held at a temperature of about 30° C. The phosphorus acid which separates as a lower layer or body is then drawn off and a stream of chlorine gas is passed into the chloride mixture until the color of the gas appears above the surface of the liquid. The amount of chlorine gas required for the above quantities of oil and phosphorus pentachloride is about 25 pounds. The temperature of the resulting mixture is then raised to about 55° C. and held at this temperature for four hours whereupon the reaction is substantially completed. Any dissolved hydrogen chloride or unreacted chlorine may be removed, if desired, by passing a current of dry air or of any other inert gas through the mixture. Any phosphorus pentachloride remaining in the product may also be removed by chilling the product until the phosphorus pentachloride crystallizes out, whereupon it may be removed by filtration or decantation.

The above invention, therefore, provides a process whereby the acid chlorides of the higher aliphatic or fatty acids, or of similar acids, may be prepared by the use of phosphorus trichloride with substantial elimination of unreacted fatty acids and acid anhydrides.

The invention also provides a process in which a substantially complete conversion of fatty acids to acid chlorides is obtained with the presence of a minimum quantity of pentachloride and, therefore, with the limiting of the amount of this material to a minimum.

The invention also provides a process in which the effect of phosphorus pentachloride in completing the conversion of acids to acid chlorides is obtained without the necessity of introducing the phosphorus pentachloride per se.

As changes of operation could be made within the scope of my invention, it is intended that all matter contained in the above description shall be interpreted as illustrative and not in a limiting sense.

What I claim is:

1. A process of producing acid chlorides which comprises reacting on the higher aliphatic acids with phosphorus trichloride, mechanically separating and removing the phosphorous acid from the resulting product, and converting the remaining trichloride to pentachloride by passing chlorine through said mixture.

2. A process of producing acid chlorides which comprises reacting on fatty acids of cocoanut oil with phosphorous trichloride, mechanically separating and removing the resulting phosphorous acid, converting the remaining phosphorus trichloride to phosphorus pentachloride, and completing the reaction with the resulting pentachloride.

3. A process of producing acid chlorides which comprises reacting on aliphatic acids of cocoanut oil with phosphorous trichloride, mechanically separating and removing the resulting phosphorous acid, and treating the remaining product with chlorine gas.

ROBERT V. TOWNEND.